United States Patent
Park et al.

(10) Patent No.: US 9,819,187 B2
(45) Date of Patent: Nov. 14, 2017

(54) DEVICE FOR SUPPLYING POWER TO HVDC CONVERTER

(71) Applicant: HYOSUNG CORPORATION, Seoul (KR)

(72) Inventors: Jung-Soo Park, Seongnam-si (KR); Hong-Ju Jung, Seoul (KR); June-Sung Kim, Anyang-si (KR)

(73) Assignee: HYOSUNG CORPORATION, Seoul (KR)

( * ) Notice: Subject to any disclaimer, the term of this patent is extended or adjusted under 35 U.S.C. 154(b) by 0 days.

(21) Appl. No.: 15/108,979

(22) PCT Filed: Dec. 24, 2014

(86) PCT No.: PCT/KR2014/012863
§ 371 (c)(1),
(2) Date: Jun. 29, 2016

(87) PCT Pub. No.: WO2015/102308
PCT Pub. Date: Jul. 9, 2015

(65) Prior Publication Data
US 2016/0322824 A1    Nov. 3, 2016

(30) Foreign Application Priority Data
Dec. 30, 2013  (KR) .................. 10-2013-0167885

(51) Int. Cl.
*H02M 5/458*    (2006.01)
*H02J 3/36*    (2006.01)

(52) U.S. Cl.
CPC ............ *H02J 3/36* (2013.01); *H02M 5/4585* (2013.01); *Y02E 60/60* (2013.01)

(58) Field of Classification Search
CPC ..... H02M 5/4585; H02J 3/36; H02J 2003/365
See application file for complete search history.

(56) References Cited

U.S. PATENT DOCUMENTS

| | | | | |
|---|---|---|---|---|
| 4,151,585 A | * | 4/1979 | Bowles | ..................... H02J 3/18 363/35 |
| 4,459,492 A | * | 7/1984 | Rogowsky | ................ H02J 3/36 307/82 |

(Continued)

FOREIGN PATENT DOCUMENTS

| KR | 10-2008-0029106 A | 4/2008 |
|---|---|---|
| KR | 10-1019683 B1 | 3/2011 |

(Continued)

*Primary Examiner* — Jeffrey Gblende
*Assistant Examiner* — David A. Singh
(74) *Attorney, Agent, or Firm* — Novick, Kim & Lee, PLLC; Jae Youn Kim

(57) ABSTRACT

A power supply device for HVDC controller is provided. The power supply device comprises: a first High Voltage Direct Current (HVDC) converter unit connected to an active power grid; a second HVDC converter unit connected to a passive power grid, the second HVDC converter unit being capable of receiving first DC power from the first HVDC converter unit by being connected to the first HVDC converter unit via a Direct Current (DC) transmission line; and an HVDC controller, arranged in the second HVDC converter unit, for receiving the first DC power, applied from the first HVDC converter unit to the second HVDC converter unit, by being connected to the DC transmission line that connects the first HVDC converter unit with the second HVDC converter unit.

5 Claims, 2 Drawing Sheets

(56) References Cited

U.S. PATENT DOCUMENTS

| | | | | |
|---|---|---|---|---|
| 4,639,846 A * | 1/1987 | Dahler | ............... | H02J 3/36 363/37 |
| 4,648,018 A * | 3/1987 | Neupauer | ............... | H02J 3/36 363/35 |
| 5,627,735 A * | 5/1997 | Bjorklund | ............... | H02J 3/1807 363/35 |
| 2005/0248477 A1* | 11/2005 | Jongsma | ............... | H03M 1/1076 341/110 |
| 2006/0034123 A1* | 2/2006 | Feldtkeller | ............... | H05B 41/2855 365/185.21 |
| 2009/0083556 A1* | 3/2009 | Zimek | ............... | H02M 1/10 713/310 |
| 2009/0219737 A1* | 9/2009 | Bjorklund | ............... | H02J 3/36 363/35 |
| 2009/0309568 A1* | 12/2009 | Hisano | ............... | G06F 1/26 323/311 |
| 2009/0316446 A1* | 12/2009 | Astrom | ............... | H02H 7/268 363/35 |
| 2012/0300510 A1* | 11/2012 | Jensen | ............... | H02J 3/36 363/35 |
| 2014/0347897 A1* | 11/2014 | Broussard | ............... | H02J 3/36 363/35 |
| 2015/0333648 A1* | 11/2015 | Son | ............... | H02M 5/44 363/35 |
| 2016/0285378 A1* | 9/2016 | Oates | ............... | H02J 3/36 |

FOREIGN PATENT DOCUMENTS

| | | |
|---|---|---|
| KR | 10-1130320 B1 | 3/2012 |
| KR | 10-2012-0095248 A | 8/2012 |
| KR | 10-1312959 B1 | 10/2013 |

* cited by examiner

DEVICE FOR SUPPLYING POWER TO HVDC CONVERTER

TECHNICAL FIELD

The present invention relates, in general, to a power supply device for an HVDC controller and, more particularly, to a DC power supply device for an HVDC controller, which may be supplied with DC power, output from an HVDC converter station connected to an AC active power grid that may supply control power, and may supply control power required for starting an HVDC conversion station, connected to an AC passive power grid, which may not supply power to the controller in the event of a power failure.

BACKGROUND ART

In a High Voltage Direct Current (HVDC) system, a method by which AC power is converted into DC power and then transmitted, and the transmitted DC power is converted into AC power is used, and the related art is disclosed in Korean Patent No. 1019683.

Korean Patent No. 1019683 relates to a voltage-sourced HVDC system and includes a voltage-sourced HVDC apparatus, a sensor unit, and a converter controller.

The voltage-sourced HVDC apparatus converts 3-phase AC voltage into high voltage DC or converts high voltage DC into 3-phase AC voltage through a converter that includes semiconductor switching elements, and the sensor unit detects 3-phase current, apparent power, and active power from the 3-phase AC voltage. The converter controller receives the detected 3-phase current, apparent power, and active power, and generates a D-axis signal and a Q-axis signal. Here, the converter controller includes a D/Q controller and a PWM unit. The D/Q controller receives the D-axis signal and the Q-axis signal and generates an active power D-axis signal and an apparent power Q-axis signal, and the PWM unit generates a pulse-width-modulated signal for turning on or off switching elements based on the output signals from the DQ controller.

The conventional converter controller, such as one disclosed in Korean Patent No. 1019683, namely, an HVDC converter station controller, is operated by being supplied with power from an AC active power grid, which may supply power by being connected to an Alternating Current (AC) transmission network, in order to control the switching elements of the HVDC converter and devices in the converter station. However, the HVDC controller of an independent AC passive power grid, which includes no AC power source but only has loads, cannot be supplied with power from the grid when it is initialized or when it is in a power failure situation, thus it uses a power generator or a battery. For example, in a voltage-sourced HVDC converter station connected to an offshore wind power generation farm, which is a passive power grid, a power generator or a battery that is capable of supplying power to an HVDC controller for quite a long time (about 72 hours) is necessary in order to prepare for a power failure situation or a regular overhaul of the offshore wind power generation farm.

In the conventional HVDC system, if a power generator is used as a power source for the HVDC controller of an independent passive power grid, when it is necessary to resume the operation of the power generator after an interruption due to a power failure or the like, the operation may be resumed through communication in the state in which the grid is located hundreds of kilometers away, such as in the case of an offshore wind power generation farm. However, in this case, an additional battery is required in order to control the power generator. Meanwhile, when a battery is used to supply power to an HVDC controller, because it must supply power for a long time, a high-capacity battery is required.

DISCLOSURE

Technical Problem

The present invention has been made keeping in mind the above problems, and an object of the present invention is to provide a power supply device for an HVDC controller, which may be supplied with DC power, output from an HVDC converter connected to an AC active power grid, and may supply power to an HVDC controller, connected to an independent AC passive power grid.

Another object of the present invention is to provide a power supply device for an HVDC controller, which may supply power to an HVDC controller connected to an AC passive power grid, whereby, when the operation of the AC passive power grid is resumed after being interrupted, the HVDC controller may be supplied with power early, and the supply of power may be controlled remotely.

A further object of the present invention is to provide a power supply device for an HVDC controller, which uses power output from an HVDC converter connected to an active power grid, and thereby may reduce the size and weight of a device for supplying power for starting an HVDC controller that is connected to a passive power grid.

Technical Solution

A power supply device for an HVDC controller according to the present invention includes a first High Voltage Direct Current (HVDC) converter unit connected to an active power grid; a second HVDC converter unit connected to a passive power grid, the second HVDC converter unit being capable of receiving first DC power from the first HVDC converter unit by being connected to the first HVDC converter unit via a Direct Current (DC) transmission line; a voltage distributor, connected to the DC transmission line that connects the first HVDC converter unit with the second HVDC converter unit, for outputting second DC power, which is lower than the first DC power, by receiving and dividing the first DC power, which is applied from the first HVDC converter unit to the second HVDC converter unit; and a DC-DC converter, connected to the voltage distributor, for receiving the second DC power, converting the second DC power into actuating power that can be used by an HVDC controller, and outputting the actuating power.

Advantageous Effects

The power supply device for an HVDC controller according to the present invention has an advantage in that power may be supplied to an HVDC controller that is connected to an independent passive power grid by being supplied with DC power, output from an HVDC converter connected to an active power grid that is capable of supplying power.

Also, the DC power supply device for an HVDC controller according to the present invention may supply power to an HVDC controller that is connected to a passive power grid, whereby, when the operation of the passive power grid is interrupted and resumed, power may be supplied to the HVDC controller early, and the supply of power may be controlled remotely. Also, because power that is output from the HVDC converter connected to an active power grid is used, the size and weight of the device for supplying power to the HVDC controller connected to the passive power grid may be reduced.

BEST MODE

Hereinafter, a preferred embodiment of the present invention will be described with reference to the accompanying drawings, and descriptions of known functions and configurations which have been deemed to make the gist of the present invention unnecessarily obscure will be omitted below.

Figure 1:
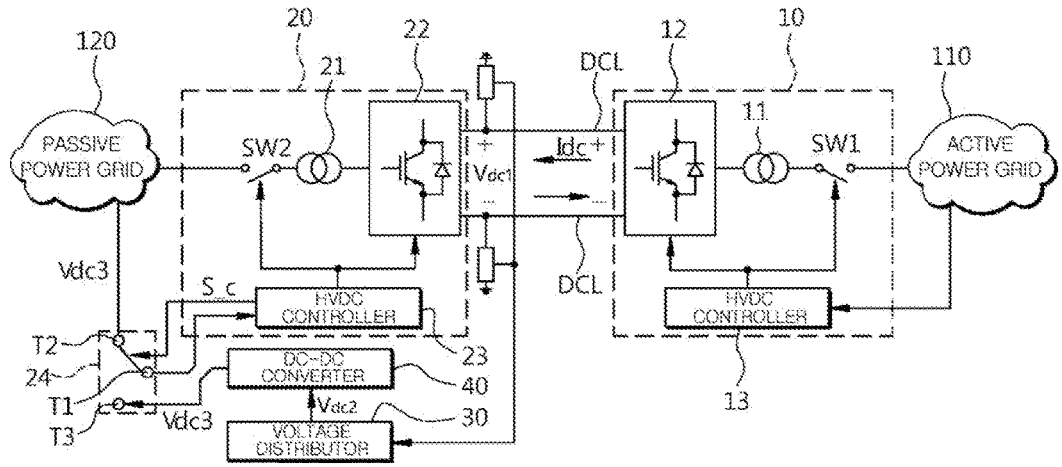
FIG. 1 is a block diagram illustrating the configuration of a DC power supply device for an HVDC controller of the present invention.

As shown in FIG. 1, the DC power supply device for an HVDC controller of the present invention includes a first High Voltage Direct Current (HVDC) converter unit 10, a second HVDC converter unit 20, a voltage distributor 30, and a DC-DC converter 40.

The first HVDC converter unit 10 is connected to an active power grid 110, and the second HVDC converter unit 20 may receive first DC power Vdc1 from the first HVDC converter unit 10 by being connected to the first HVDC converter unit 10 via a Direct Current (DC) transmission line DCL. The voltage distributor 30 is connected to the DC transmission line, which connects the first HVDC converter unit 10 with the second HVDC converter unit 20, and outputs second DC power Vdc2, which is lower than the first DC power Vdc1, by receiving and distributing the first DC power Vdc1, which is applied from the first HVDC converter unit 10 to the second HVDC converter unit 20. The DC-DC converter 40 receives the second DC power Vdc2 by being connected to the voltage distributor 30, converts it into actuating power Vdc3 that can be used by the HDVC controller 23, and outputs it to the controller 23 of the second HVDC converter unit 20.

The configuration of the DC power supply device for an HVDC controller of the present invention, which includes the above-mentioned components, will be described in detail with reference to the accompanying drawings.

As shown in FIG. 1, the first or second HVDC converter unit 10 or 20 may include a switch SW1 or SW2, a transformer 11 or 21, an HVDC converter 12 or 22, an HVDC controller 13 or 23, and auxiliary devices not illustrated in the drawings, such as a cooling device and the like.

When the first HVDC converter unit 10 is first operated, the HVDC controller 13 of the first HVDC converter unit 100 enables the HVDC converter 12 to receive Alternating Current (AC) power from the active power grid 110, which may generate and output AC power, through the transformer 11 by turning on the switch SW1, that is, by the operation of closing the switch, to convert the received AC power into the first DC power Vdc1, and to apply it to the DC transmission line DCL. Additionally, all of the power required for operation of the other components of the first HVDC converter unit 10, such as the cooling device and the like, is supplied from the active power grid 110.

The second HVDC converter unit 20 is connected to a passive power grid 120, wherein the passive power grid 120 is an electrical grid without a power source, which generates AC power when it operates normally, but may not generate AC power by itself when the operation thereof is interrupted.

In order to perform the overall control of the second HVDC converter unit 20, the HVDC controller 23 is operated by being supplied with power from the passive power grid 120 when the passive power grid 120 is operating normally. The HVDC controller 23 has a power supply selection switch 24.

The power supply selection switch 24 has a first contact terminal T1, a second contact terminal T2, and a third contact terminal T3. The first contact terminal T1 is connected to the HVDC controller 23, and the second contact terminal T2 receives power from the passive power grid 120 by being connected to the passive power grid 120. The third contact terminal T3 receives power from the DC-DC converter 40 by being connected to the DC-DC converter 40.

The power supply selection switch 24 selectively applies the power from the second contact terminal T2 or the power from the third contact terminal T3 by being switched depending on whether a switch control signal S_c is generated, that is, depending on the control of the HVDC controller 23, and thereby may supply actuating power Vdc3, which can be used by the HVDC controller 23, to the HVDC controller 23. In other words, depending on the control by the HVDC controller 23, the power supply selection switch 24 may apply actuating power Vdc3 from the passive power grid 120 to the HVDC controller when the passive power grid 120 is operating normally, or may apply actuating power Vdc3, output from the DC-DC converter 40 to the HVDC controller 23, when the passive power grid 120 is not operating normally.

For example, during the normal operation of the passive power grid 120, the HVDC controller 23 is supplied with actuating power Vdc3 from the passive power grid 120 by maintaining the connection between the first contact terminal T1 and the second contact terminal T2 of the power supply selection switch 24. Meanwhile, when the operation of the passive power grid 120 is interrupted, the HVDC controller 23 generates a switch control signal S_c in order to connect the first contact terminal T1 with the third contact terminal T3 of the power supply selection switch 24, and thereby receives actuating power Vdc3 output from the DC-DC converter 40.

Figure 2:
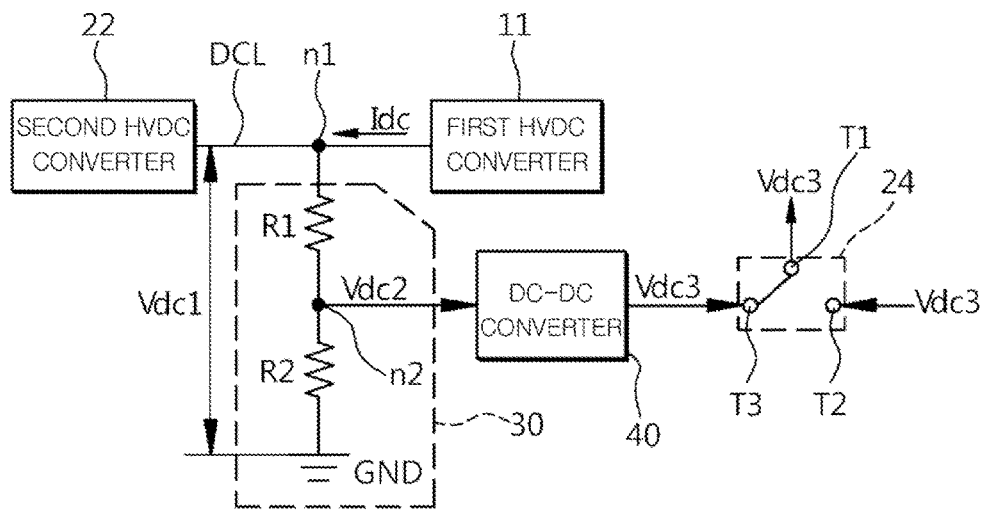
FIG. 2 is a circuit diagram of the DC power supply device for an HVDC controller, illustrated in FIG. 1.

The voltage distributor 30 is configured to have a first resistor R1 and a second resistor R2, as shown in FIG. 2

The first resistor R1 is connected between a first node n1, which is connected to the DC transmission line DCL, and a second node n2 so as to be arranged parallel to the DC transmission line DCL. Here, the first node n1 is connected to the DC transmission line DCL. In order to output the second DC power Vdc2, acquired by dividing the first DC power Vdc1, the second resistor R2 is arranged in series with the first resistor R1, and is connected between the second node n2 and a ground GND. The DC-DC converter 40, connected to the second node n2, generates actuating power Vdc3 by receiving the second DC power Vdc2, which is divided through the first resistor R1 and the second resistor R2 and is output via the second node n2, and applies it to the third contact terminal T3 of the power supply selection switch 24.

Figure 3:
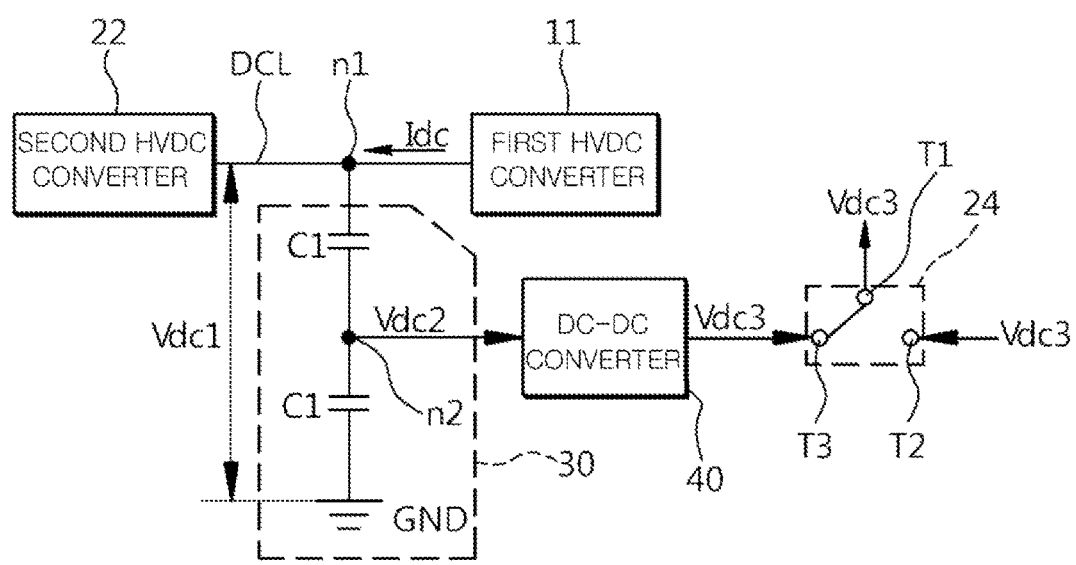
FIG. 3 is a circuit diagram illustrating another embodiment of the voltage distributer illustrated in FIG. 2.

Another embodiment of the voltage distributor 30 is illustrated in FIG. 3. As illustrated in FIG. 3, another embodiment of the voltage distributor 30 is configured to include a first capacitor C1 and a second capacitor C2.

The first capacitor C1 is connected between a first node n1, which is connected to the DC transmission line DCL, and a second node n2 so as to be arranged parallel to the DC transmission line DCL, and the second capacitor C2 is arranged in series with the first capacitor C1 and is connected between the second node n2 and a ground GND in order to output the second DC power Vdc2, acquired by dividing the first DC power Vdc1. The DC-DC converter 40, connected to the second node n2, generates the actuating power Vdc3 by receiving the second DC power Vdc2, which is divided through the first capacitor C1 and the second capacitor C2 and is output via the second node n2, and applies it to the third contact terminal T3 of the power supply selection switch 24, whereby the HVDC controller 23 is operated, and thus the second HVDC converter unit 20 may be operated.

The operation of the DC power supply device for an HVDC controller of the present invention, configured as described above, is described below.

The active power grid 110, connected to the first HVDC converter unit 10, is a power grid that is connected with a thermoelectric power plant, a hydroelectric power plant, or a nuclear power plant (not illustrated), and may continue generating AC power or may generate AC power by itself after power failure. The passive power grid 120, connected to the second HVDC converter unit 20, is a power grid that has no power plant or includes a power plant that cannot generate AC power by itself after a power failure, such as a wind power plant or the like.

Because the first HVDC converter unit 10, connected to the active power grid 110, and the second HVDC converter unit 20, connected to the passive power grid 120, are connected with each other through the DC transmission line DCL, when power generation is interrupted in the passive power grid 120, the first power Vdc1, applied from the first HVDC converter unit 10 to the second HVDC converter unit 20, is maintained.

The first HVDC converter unit 10 generates and outputs first power Vdc1 through the active power grid 110, the transformer 11, and the HVDC converter 12. Specifically, the AC power is converted into the first DC power Vdc1 through the HVDC converter 12, and is then applied to the DC transmission line DCL. Here, the switch SW1 is connected between the active power grid 110 and the transformer 11, and the switch is turned on or off by being controlled by the HVDC controller 13.

The second HVDC converter unit 20 generates first DC power Vdc1 by converting AC power, generated from the passive power grid 120, into DC power through the transformer 21 and the HVDC converter 22, and applies it to the DC transmission line DCL. Because the second HVDC converter unit 20 is connected to the passive power grid 120, when the operation of the passive power grid 120 is interrupted, the HVDC controller 23 must be operated by enabling actuating power, namely, the third DC power Vdc3, to be applied to the HVDC controller 23. This is required when the operation of the passive power grid 120 is resumed after being interrupted.

Because the HVDC controller 23 is connected to the passive power grid 120 through the power supply selection switch 24, when the passive power grid 120 is operating normally, it is operated by receiving actuating power Vdc3, which is applied from the passive power grid 120, through the power supply selection switch 24. When the operation of the passive power grid 120 is interrupted, the HVDC controller 23 generates and outputs a switch control signal S_c. The method for detecting whether the operation of the passive power grid 120 is interrupted is performed by the HVDC controller 23, and because known technology is applied thereto, a description thereabout will be omitted.

When the switch control signal S_c is applied from the HVDC controller 23, the power supply selection switch 24 connects the first contact terminal T1 with the third contact terminal T3, whereby the actuating power Vdc3, output from the DC-DC converter 40, connected to the third contact terminal T3, is applied to the HVDC controller 23 so as to enable the HVDC controller 23 to use the actuating power Vdc3. The DC-DC converter 40 receives the second DC power Vdc2, applied from the voltage distributor 30, converts it into the actuating power Vdc3, which can be used by the HVDC controller 23, and applies it to the HVDC controller 23 via the third contact terminal T3.

The second DC power Vdc2 is generated in the voltage distributor 30 and is applied to the DC-DC converter 40. The voltage distributor 30 divides the second DC power Vdc2 using the first resistor R1 and the second resistor R2, arranged in parallel with the DC transmission line DCL, or using the first capacitor C1 and the second capacitor C2, arranged in parallel with the DC transmission line DCL, and delivers the divided power to the DC-DC converter 40. The DC-DC converter 40 converts the second DC power Vdc2 into the actuating power Vdc3 and applies it to the HVDC controller 23 through the power supply selection switch 24.

Because the HVDC controller 23 is operated using the first DC power Vdc1, output from the HVDC converter 12 of the first HVDC converter unit 10, it may be continuously supplied with the actuating power Vdc3 while the active power grid 110 operates. That is, because the active power grid 110 is used to supply actuating power Vdc3, the HVDC controller 23 can be operated even when the operation of the passive power grid 120 is interrupted, that is, even in the event of a power failure, whereby the HVDC controller 23 may control the second HVDC converter unit 20, and thus it is possible to remotely start the operation of the second HVDC converter unit 20 early.

Also, because the DC power supply device for an HVDC controller of the present invention enables the stable supply of actuating power Vdc3 to the HVDC controller 23, which is connected to the passive power grid 120, when the operation of the passive power grid 120 is interrupted and then resumed, the actuating power Vdc3 may be supplied to the HVDC controller 23 early, and the supply of power may be controlled remotely. Also, because the power output from the HVDC converter 12 connected to the active power grid 110 is used, it is possible to reduce the size and weight of the device for supplying actuating power Vdc3 to the HVDC controller 23 connected to the passive power grid 120.

Although the present invention has been described in detail through the preferred embodiments, the present invention is not limited thereto. Therefore, those skilled in the art will appreciate that various modifications and other equivalent embodiments are possible without departing from the spirit of the present invention. Therefore, the technical scope of the present invention should be defined by the technical spirit of the claims.

The invention claimed is:

1. A power supply device for an HVDC controller, comprising:
a first High Voltage Direct Current (HVDC) converter unit connected to an active power grid;

a second HVDC converter unit connected to a passive power grid, the second HVDC converter unit being capable of receiving first DC power from the first HVDC converter unit by being connected to the first HVDC converter unit via a Direct Current (DC) transmission line; and an HVDC controller, arranged in the second HVDC converter unit, for receiving the first DC power, applied from the first HVDC converter unit to the second HVDC converter unit, by being connected to the DC transmission line that connects the first HVDC converter unit with the second HVDC converter unit, wherein the HVDC controller includes a voltage distributor and a DC-DC converter, wherein the voltage distributor receives the first DC power and outputs second DC power which is acquired by dividing the first DC power and is lower than the first DC power, and wherein the DC-DC converter is configured to receive the second DC power by being connected to the voltage distributor, to convert the second DC power into actuating power to be used by the HVDC controller, and to output the actuating power.

2. The power supply device of claim 1, wherein the second HVDC converter unit includes the HVDC controller having a power supply selection switch, wherein the power supply selection switch includes a first contact terminal, connected to the HVDC controller, a second contact terminal, which receives actuating power applied from the passive power grid by being connected to the passive power grid, and a third contact terminal, which receives actuating power applied from a DC-DC converter by being connected to the DC-DC converter, and the power supply selection switch selectively applies the actuating power, applied to the second contact terminal, or the actuating power, applied to the third contact terminal, to the first contact terminal by being switched based on control by the HVDC controller, and thereby supplies the actuating power to the HVDC controller.

3. The power supply device of claim 2, wherein the HVDC controller is configured to:

be supplied with actuating power from the passive power grid by connecting the first contact terminal and the second contact terminal of the power supply selection switch when the passive power grid operates normally; and be supplied with actuating power output from the DC-DC converter by connecting the first contact terminal and the third contact terminal of the power supply selection switch when an operation of the passive power grid is interrupted.

4. The power supply device of claim 1, wherein the voltage distributor includes:

a first resistor connected between a first node, connected to the DC transmission line, and a second node so as to be arranged in parallel with the DC transmission line; and a second resistor, arranged in series with the first resistor in order to divide the first DC power and output the second DC power, the second resistor being connected between the second node and a ground, wherein the DC-DC converter, connected to the second node, receives the second DC power, which is divided through the first resistor and the second resistor and is output via the second node.

5. The power supply device of claim 1, wherein the voltage distributor includes:

a first capacitor connected between a first node, connected to the DC transmission line, and a second node so as to be arranged in parallel with the DC transmission line; and a second capacitor, arranged in series with the first resistor in order to divide the first DC power and output the second DC power, the second capacitor being connected between the second node and a ground, wherein the DC-DC converter, connected to the second node, receives the second DC power, which is divided through the first capacitor and the second capacitor and is output via the second node.

* * * * *